A. B. MITCHELL.
WIRE MESH FILTERING SCREEN.
APPLICATION FILED FEB. 2, 1915.
1,282,913.
Patented Oct. 29, 1918.
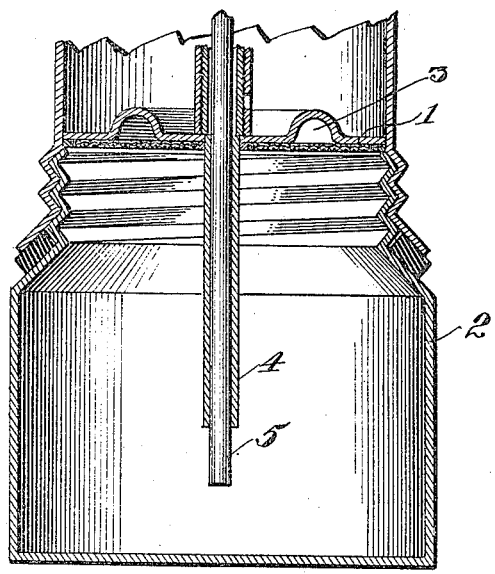
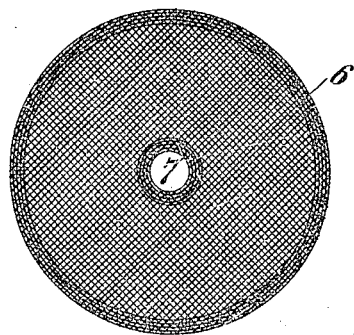
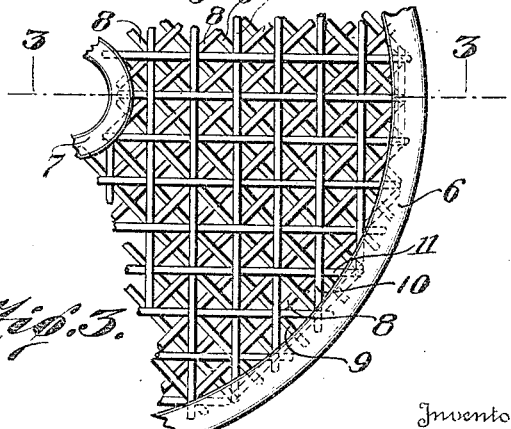
Inventor
ARTHUR B. MITCHELL.

UNITED STATES PATENT OFFICE.

ARTHUR B. MITCHELL, OF BIRMINGHAM, ALABAMA.

WIRE-MESH FILTERING-SCREEN.

1,282,913.        Specification of Letters Patent.      Patented Oct. 29, 1918.

Application filed February 2, 1915. Serial No. 5,810.

*To all whom it may concern:*

Be it known that I, ARTHUR B. MITCHELL, a citizen of the United States of America, residing at Birmingham, in the county of Jefferson and State of Alabama, have invented certain new and useful Improvements in Wire-Mesh Filtering-Screens, of which the following is a specification.

My invention relates to a novel type of wire mesh screen which is especially adapted for conditions of use which require a screen of a very fine mesh which shall possess substantial body strength and stiffness.

The particular object of my invention is to design a wire mesh screen which will effectively filter acetylene or other gases, having fine matter in suspense therein, and deliver the gas in a substantially pure condition to the burner or other point of use. Filtering screens of this type have not heretofore been successfully obtained from a single thickness of wire mesh having the requisite fineness of mesh because it was found in such cases that the screen was not only very flexible and flimsy, but that the meshes became readily clogged. According to my invention I propose to form such a screen by a pair of superimposed attached layers of different size wire mesh which are so combined and arranged that the strands of larger mesh screen when superimposed over the strands of the smaller substantially bisect the rectangular interstices of the latter. As a result a corresponding reinforced wire screen is obtained having a screening or filtering capacity equivalent to a screen of double the number of meshes of the layer having the smaller interstices and at the same time having many times the body strength and rigidity of a screen formed of a single layer of the same mesh. Moreover the tendency of my compound screen to become clogged is much less than that of a single layer screen of the same mesh.

My invention further comprises the details of construction and arrangement of parts, which in their preferred embodiment only are hereinafter more particularly described, reference being had to the accompanying drawings which form a part of this specification, and in which:—

Figure 1 is a partial vertical sectional view showing in transverse vertical cross section my screen as applied to an acetylene miner's lamp.

Fig. 2 is a plan view of the detached screen, which is intended to illustrate the manner in which the layers of the screen, illustrated in Fig. 1, are attached together and which, for the sake of clearness, do not attempt to illustrate the strands of the under layer.

Fig. 3 is an enlarged view of a screen in which the strands of the two superimposed layers are illustrated; and Fig. 4 is a sectional view taken on the line 3—3 of Fig. 3.

Similar reference numerals refer to similar parts throughout the drawings.

Though I have illustrated my invention as in the form particularly adapted for a wire mesh screen for filtering acetylene gas, I desire it to be understood that it may be applied in any other arts where the advantages inherent in my construction make it desirable. The screen is shown interposed between the bottom 1 of the water chamber of the lamp and the top 2 of the generating compartment, the screen being detachably held between the parts when the latter have their threaded portions screwed tightly together. The bottom 1 is provided with an annular gas collecting groove 3 for the filtered gas which is discharged therefrom in any suitable manner to the burner. The water tube 4 passes down through the center of the bottom 1 and is provided with the valve rod 5 in accordance with the general practice. It will be noted that the screen lies flush against the bottom 1 of the tank and that it presents a strong and compact device for screening the gas and that it is readily removable and interchangeable.

The screen, as illustrated in Fig. 1, comprises two superimposed layers of wire gauze which are circular in shape and are joined along their peripheral margins by a fastening means such as a strip of solder 6. These disks are cut away at their centers to provide for the passage of the tube 4 and may there be joined by an inner marginal strip of solder 7 which holds their inner central portions in fixed relationship. In Fig. 3 I show the two superimposed layers of wire gauze, the lower layer being formed by the rectangularly crossed strands 8 and 9. It will be apparent from this figure that the size of the mesh formed by the strands 10 and 11 is larger than that of the mesh formed by the strands 8 and 9. The purpose of this difference in mesh is to provide for the strands of the larger mesh layer to bisect the interstices between the smaller mesh strands of the lower layer. The two layers may be held in their predetermined and contiguous relationship by any suitable means other than that shown, but in order to obtain the results contemplated by my invention the layers must be superimposed so that they form in effect a compound two layer screen having, by means of the reinforcing effect of the double thicknesses, much greater body strength and rigidity than a fine mesh screen and at the same time forming an extremely fine mesh filtering screen as compared with the mesh of either layer. The advantage of attaching the outer and inner margins of the screens by solder, is that by this means I form the compound reinforced screen as a complete article of manufacture without requiring the screen layers to be assembled at the time of use and which also permits the screen to be readily applied and detached at points of use. I prefer to use two layers only as I can get access to the mesh of both layers to effectively clean the screen.

Obviously, certain substantial benefits would result from the superimposition and attachment of two layers of screen whether of similar or dissimilar mesh in which their strands were so disposed relatively as to reduce to a substantial extent the interstitial area of the compound screen while increasing its body strength and rigidity.

What I claim as new and desire to secure by Letters Patent, is:—

1. As an article of manufacture, a gas filtering screen for acetylene lamps comprising two contiguous layers of wire screening of different mesh, the strands of one screen being laid to diagonally bisect the interstitial spaces of the other screen, said screens having a central opening, and marginal fastenings to secure the edges of the screens fixed in their said position, substantially as described.

2. As an article of manufacture, a filtering screen for acetylene lamps formed in two circular layers of wire screen gauze of different mesh, said screens being of such relative mesh and so superimposed as to cause the strands of the smaller mesh screen to diagonally bisect the interstitial meshes of the larger mesh screen, and a marginal binder for rigidly holding the screen layers contiguous in their said relationship so that the layers reinforce each other, substantially as described.

In testimony whereof I affix my signature in presence of two witnesses.

ARTHUR B. MITCHELL.

Witnesses:
NOMIE WELSH,
R. D. JOHNSTON, Jr.

Copies of this patent may be obtained for five cents each, by addressing the "Commissioner of Patents, Washington, D. C."